United States Patent
Harrington

(10) Patent No.: US 7,320,843 B2
(45) Date of Patent: Jan. 22, 2008

(54) BATTERY ASSEMBLY WITH SHIELDED TERMINALS

(75) Inventor: Jeffrey M. Harrington, Vancouver, WA (US)

(73) Assignee: Great Stuff, Inc., Austin, TX (US)

(*) Notice: Subject to any disclaimer, the term of this patent is extended or adjusted under 35 U.S.C. 154(b) by 705 days.

(21) Appl. No.: 10/788,644

(22) Filed: Feb. 27, 2004

(65) Prior Publication Data

US 2005/0191543 A1    Sep. 1, 2005

(51) Int. Cl.
*H01M 2/10* (2006.01)
*H01M 2/30* (2006.01)

(52) U.S. Cl. .................. 429/97; 429/100; 429/121
(58) Field of Classification Search .......... 429/96, 429/97, 100, 121
See application file for complete search history.

(56) References Cited

U.S. PATENT DOCUMENTS

| | | | |
|---|---|---|---|
| 3,709,252 A | 1/1973 | Bishop | |
| 4,311,165 A | 1/1982 | Rose, Jr. | |
| 4,513,772 A | 4/1985 | Fisher | |
| 4,759,560 A | 7/1988 | Virgulti | |
| 4,832,074 A | 5/1989 | Li | |
| 4,893,037 A | 1/1990 | Schwartz | |
| 4,993,449 A | 2/1991 | Stutzman et al. | |
| 5,200,280 A * | 4/1993 | Karasa | 429/65 |
| 5,303,866 A | 4/1994 | Hawks, Jr. | |
| 5,495,995 A | 3/1996 | Dominique et al. | |
| 6,092,548 A | 7/2000 | DeVito | |
| 6,170,179 B1 | 1/2001 | Paytas et al. | |
| 6,190,796 B1 | 2/2001 | Chalasani et al. | |
| 6,350,149 B1 | 2/2002 | Nakane | |
| 2003/0047364 A1 | 3/2003 | Lipman | |

FOREIGN PATENT DOCUMENTS

| | | |
|---|---|---|
| JP | 58023162 | 2/1983 |
| WO | WO 9524061 | 9/1995 |

OTHER PUBLICATIONS

International Search Report for Application No. PCT/US2005/006080, dated Mar. 30, 2006.

* cited by examiner

*Primary Examiner*—Tracy Dove
(74) *Attorney, Agent, or Firm*—Knobbe, Martens, Olson & Bear, LLP

(57) ABSTRACT

A battery assembly comprises a battery and a housing adapted for use in an environment often exposed to water. The housing preferably has recessed portions spaced far apart at the top end thereof, with electrical terminals disposed in the recessed portions. The recessed portions are configured to securely receive corresponding downward-facing compartments disposed at the top of the battery, wherein the compartments have recessed openings housing electrical terminals. Accordingly, the electrical terminals of the housing are configured to contact the electrical terminals of the battery when the battery's compartments are disposed in the housing's recessed portions, forming a substantially watertight seal.

22 Claims, 11 Drawing Sheets

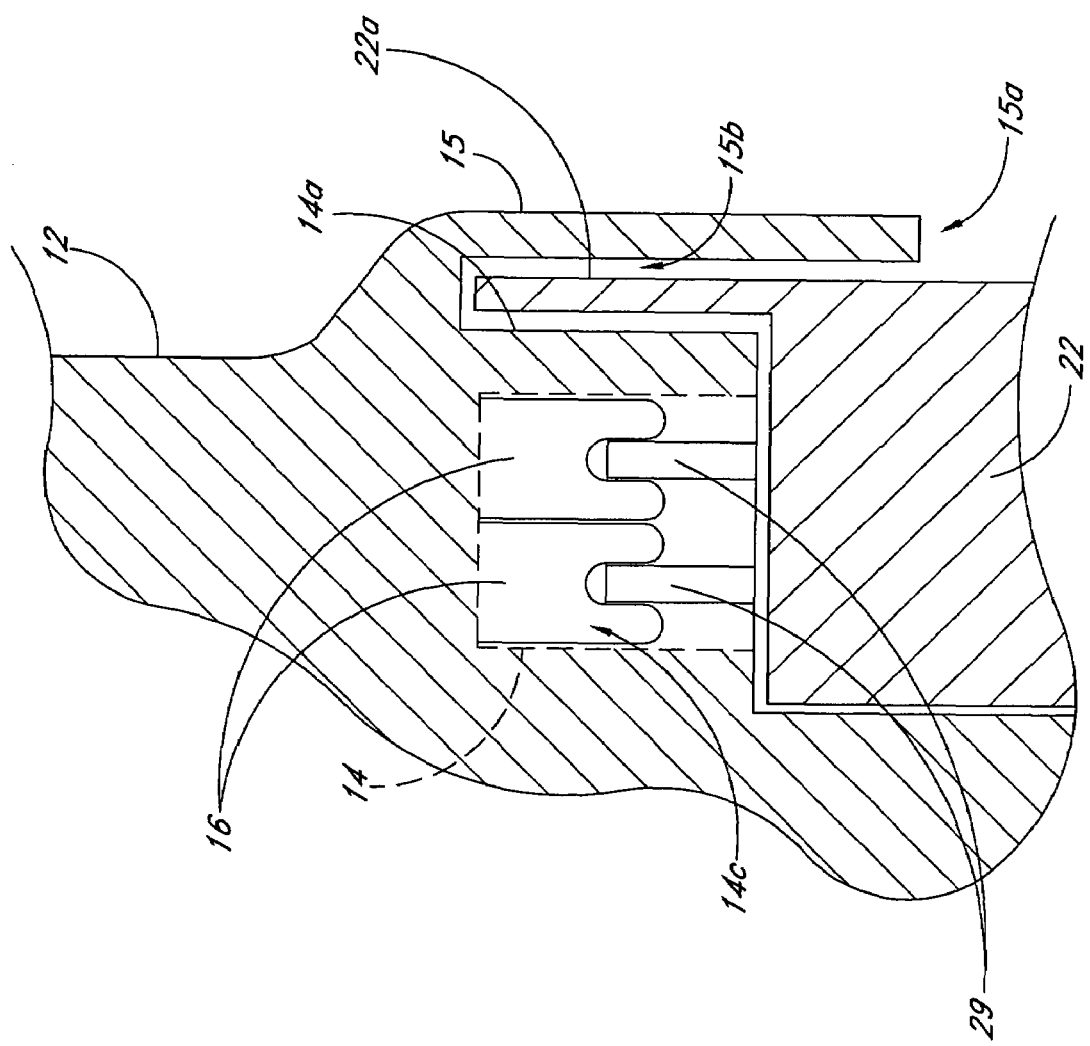

BATTERY ASSEMBLY WITH SHIELDED TERMINALS

BACKGROUND OF THE INVENTION

1. Field of the Invention

The present invention is directed to battery assemblies in general, and in particular, to batteries and housings therefor for outdoor use or use otherwise subject to moisture and/or debris.

2. Description of the Related Art

Batteries are commonly used as power sources in a variety of devices and vehicles. For example, they can be used as a primary source of power, in place of bulkier or more polluting sources, such as internal combustion engines. Alternatively, batteries can supplement other power sources, such as solar cells.

However, because of how conventional batteries are designed and mounted, their use is limited to certain operating conditions, which limits the type of devices that can be powered with batteries. For example, conventional batteries are generally mounted to a platform or housing with their electrical terminals exposed, so exposure to water would short-circuit the battery assembly. Accordingly, conventional battery designs are not suitable for use with devices that will likely be exposed to water.

Additionally, conventional batteries having exposed terminals are susceptible to short-circuiting if used in an open environment. This is possible even where the terminals are spaced relatively far apart. For example, a branch or other object could fall onto the battery and touch its electrical terminals, causing the battery to short-circuit. Water and other liquids can similarly cause short-circuiting across the terminals.

Furthermore, installation and removal of conventional batteries often involves a number of time-consuming steps. For example, vehicle batteries are generally disposed on a supporting platform. Battery cables are then connected to each of the battery's exposed terminals by tightening, for example, clamping rings of the cables about the terminals using a screwdriver, crescent wrench, or the like. Disconnection of the battery involves loosening the rings about the terminals and performing the steps above in reverse order. Such fixation schemes are typical wherever motors or other sources of vibration risk loosening of contacts.

Thus, there is a need for a battery and housing design that addresses the problems identified above.

SUMMARY OF THE INVENTION

In one aspect of the present application, a battery assembly is provided comprising a battery and a housing configured to removably receive the battery. The battery has a body with compartments disposed on opposite sides of the body, each compartment housing an electrical terminal. The housing has recessed portions on opposite side walls of the housing, each recessed portion housing also housing an electrical terminal. The recessed portions of the housing removably receive the battery body compartments therein so that the electrical terminals of the battery and housing operatively contact each other.

In another aspect of the invention, a battery assembly is provided comprising a battery with battery electrodes disposed on opposite sides of the battery. The battery assembly also comprises a housing with housing electrodes disposed on opposite side walls of the housing. The housing is configured to removably receive the battery therein so that the housing electrodes operatively contact the battery electrodes. The battery assembly also has means for preventing the short-circuiting of the battery.

In still another aspect of the invention, a method for installing a battery is provided. The method comprises providing a battery having battery electrodes disposed on opposite sides of the battery. The method also comprises providing a housing having housing electrodes disposed on opposite side walls of the housing. The method further comprises moving the battery and housing relative to each other so that the battery electrodes and housing electrodes operatively contact each other.

In yet another aspect of the present application, a method for operating a hose reel mechanism is provided. The method comprises providing a motor operatively connected to a drum of the hose reel mechanism. The method also comprises providing a battery assembly comprising a battery with battery electrodes on opposite sides of the body and a housing defining a housing recess and having housing electrodes on opposite side walls of the housing, wherein the housing is operatively connected to the motor. The method further comprises inserting the battery into the housing so that the battery body is disposed in the housing recess and the battery electrodes operatively contact the housing electrodes. The battery is configured to provide power to the motor to rotate the drum.

BRIEF DESCRIPTION OF THE DRAWINGS

FIG. 9B is a sectional view of the assembled battery and housing, taken along lines 9B-9B of in FIG. 9.

DETAILED DESCRIPTION OF THE PREFERRED EMBODIMENT

Figure 1:
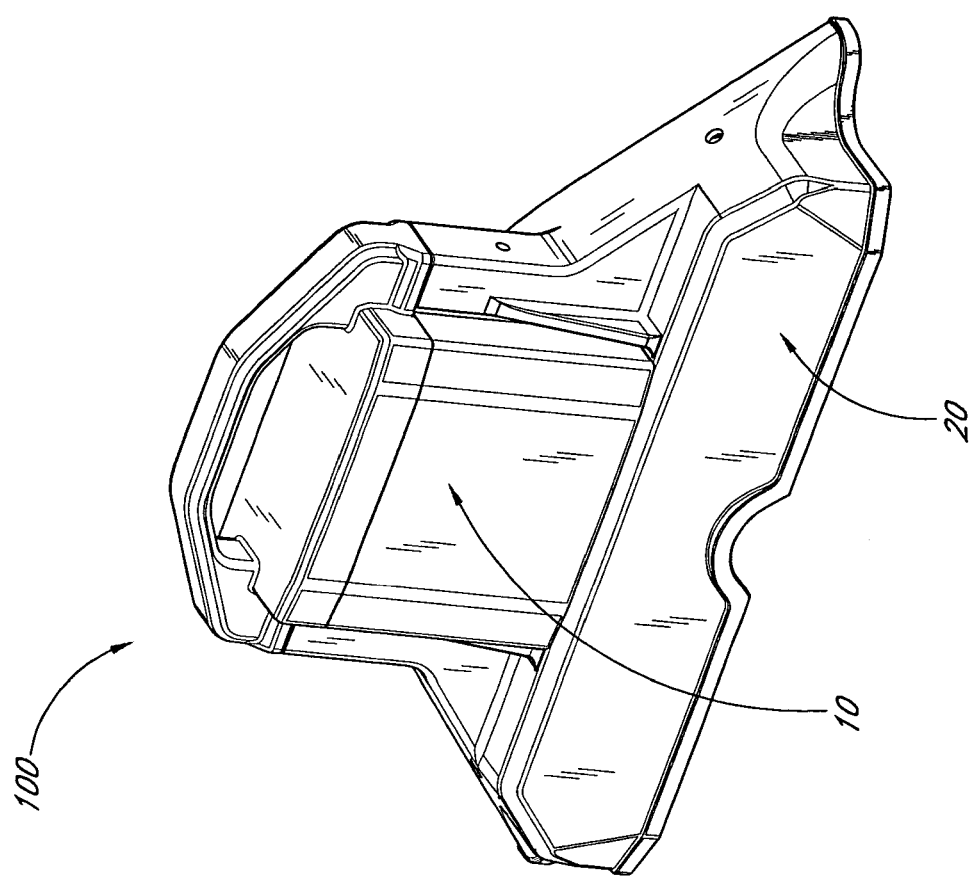
FIG. 1 is a front, top and right side isometric view of one embodiment of an assembled battery assembly.

FIG. 1 illustrates one embodiment of a battery assembly 100. The assembly 100 preferably comprises a battery 10 and a housing 20. In the illustrated embodiment, the assembly 100 is shown fully assembled, with the battery 10 disposed in the housing 20.

Figure 2B:
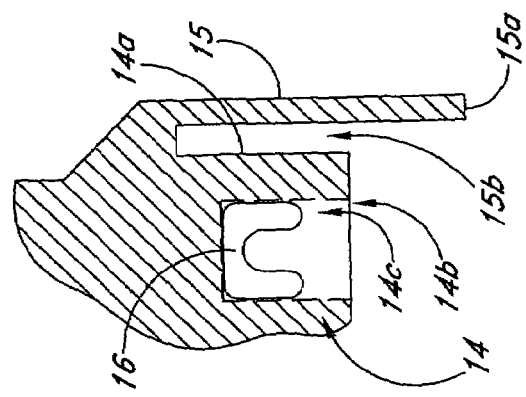
FIG. 2B is a cross-sectional view of the battery, taken along lines 2b-2b of FIG. 2A.
Figure 2A:
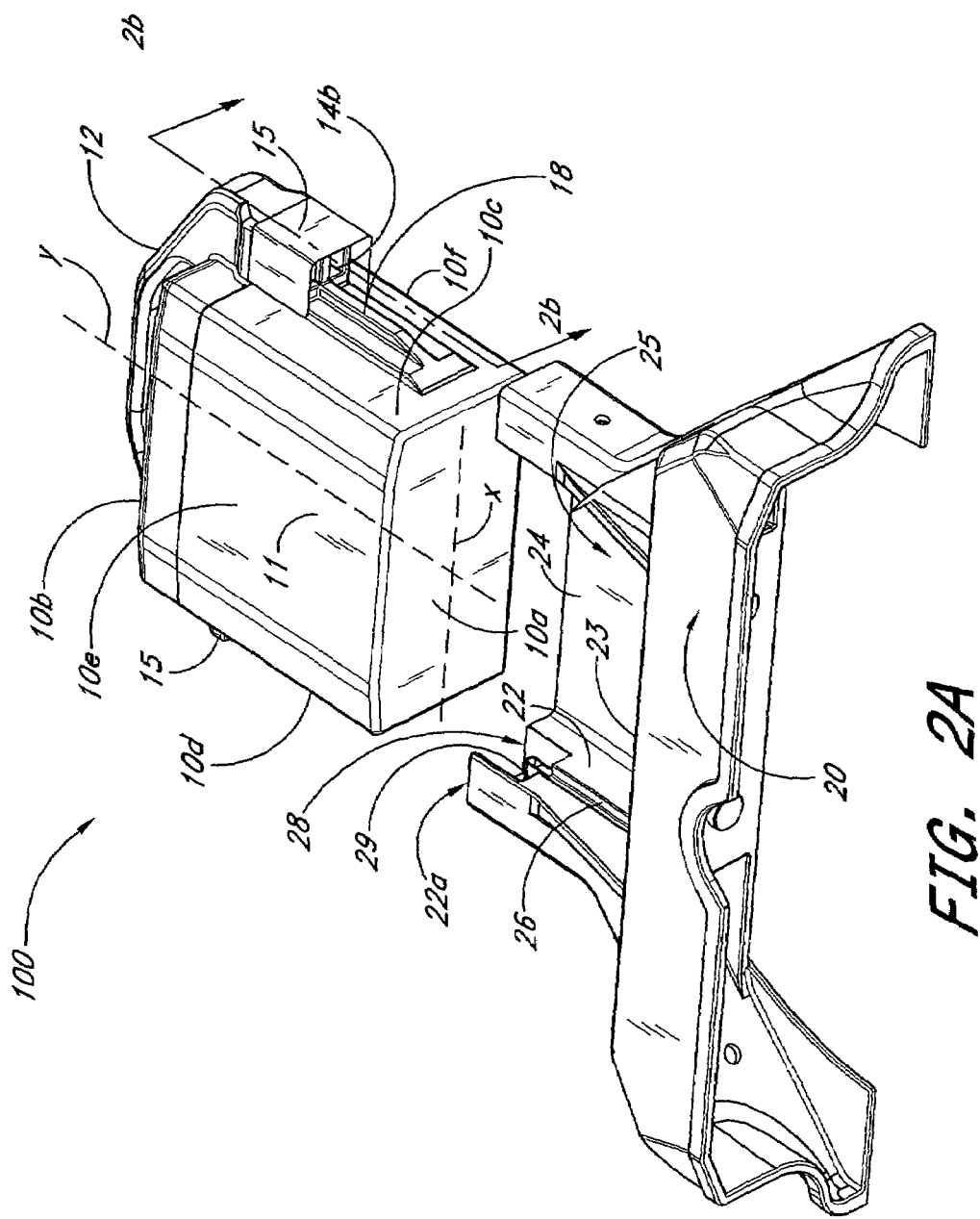
FIG. 2A is an isometric view of the battery assembly in FIG. 1.
Figure 3:
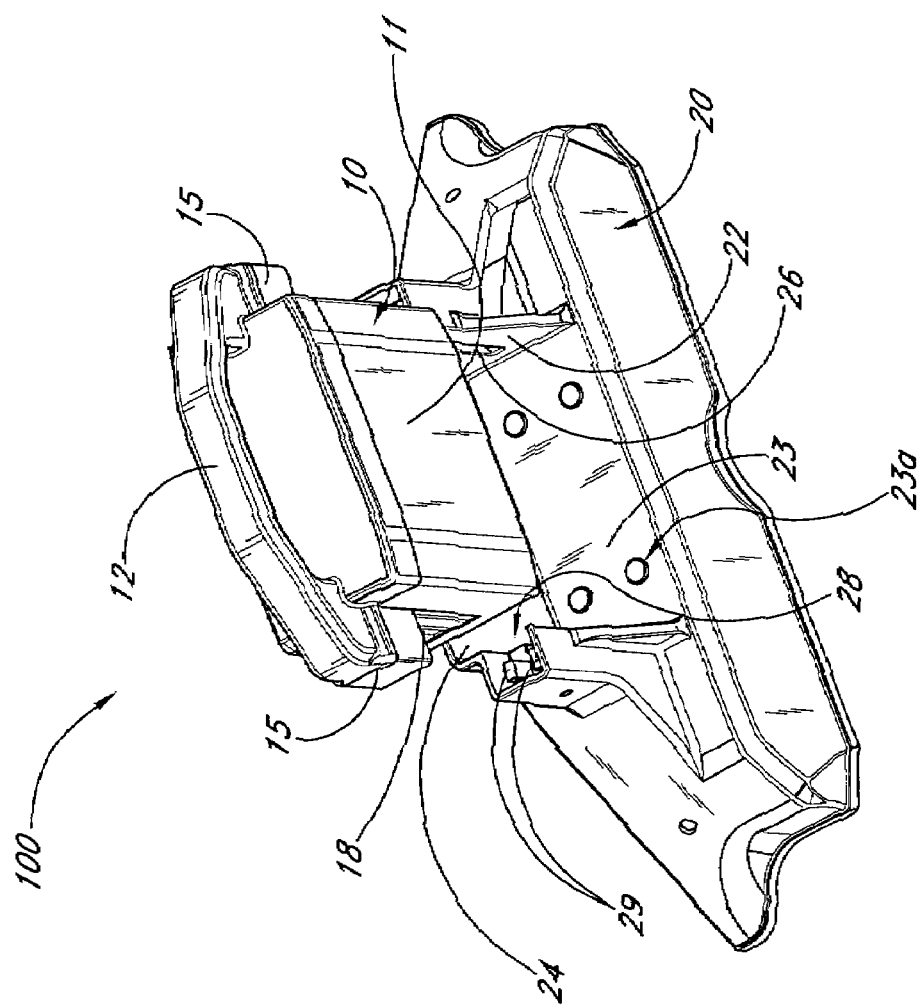
FIG. 3 is a front, top and left side isometric view of the battery and housing in FIG. 1.

FIGS. 2A-3 show the battery 10 and housing 20 of FIG. 1 aligned for loading or insertion. The battery 10 has a body 11 that preferably extends between a base 10a and a top 10b. In the illustrated embodiment, the base 10a is generally planar, so that it is generally perpendicular to an axis Y extending between the base 10a and top 10b of the battery 10. However, in other embodiments, the base can have different shapes, such as curved. The battery 10 also defines side faces 10c, 10d extending between the base 10a and top 10b. The side faces 10c, 10d are preferably generally parallel to each other and generally perpendicular to an axis X extending between the side faces 10c, 10d. The battery 10 also has front and back faces 10e, 10f extending between the base 10a and the top 10b. In one embodiment, the front and back faces 10e, 10f are generally parallel to the axis Y. In the illustrated embodiment, the side faces 10c, d and front and back faces 10e, f are generally planar, so that the battery 10 has a generally rectangular cross-section. However, in other embodiments the faces 10c, d, e, f are curved, so that the battery 10 has, for example, an oval or round cross-section.

As shown in FIGS. 2A and 3, the battery 10 comprises a handle 12 attached thereto. In the illustrated embodiment, the handle 12 extends between the side faces 10c, 10d and attaches to the top 10b and side faces 10c, 10d of the battery 10. However, in other embodiments, the handle 12 can attach solely to the top face 10b, solely to the side faces 10c, 10d, or solely to the front and back faces 10e, f. Preferably, the handle 12 is adapted to support the weight of the battery 10 when a user lifts or raises the battery 10 by the handle 12. Preferably, the handle 12 is integrally formed with the battery 10. In other embodiments, the handle 12 can be removably connected to the battery 10 by, for example, screws, bolts, adhesives, or bands. The handle 12 preferably defines an opening O (see FIG. 6) between the handle 12 and the top 10b of the battery 10, where the opening O is adapted to receive a human hand, a hook, or any other object suitable for lifting and supporting the weight of the battery 10.

As shown in FIGS. 2A-2B, the battery 10 also comprises at least one compartment 14. In the illustrated embodiment, the battery 10 has a compartment 14 connected to each of the side faces 10c, 10d (see FIG. 6). The compartment 14 defines at least one side surface 14a about its periphery. In the illustrated embodiment, the compartment 14 has three generally flat side surfaces 14a. However, the side surface 14a can have other configurations, such as cylindrical. In the illustrated embodiment, the compartment 14 is attached to the handle 12 proximal the top 10b of the battery 10. However, in some embodiments, the compartment 14 can be independent of said handle 12. The compartment 14 defines an open end 14b preferably facing generally in the direction of the base 10a of the battery 10. The compartment 14 also defines a cavity 14c that communicates with the open end 14b. The cavity 14c houses at least one electrical terminal 16 (e.g., a battery terminal or electrode) therein. The electrical terminal 16 is operatively connected to the battery 10 in a manner that is well known in the art. Preferably, the electrical terminal 16 is shaped as a receptacle, and is configured to receive therein a corresponding terminal on the housing (discussed in more detail below). In the illustrated embodiment, a skirt 15 extends about the side surface 14a of the compartment 14. The skirt 15 preferably has a free end 15a and defines a longitudinal slot 15b between the skirt 15 and the at least one side surface 14a.

Figure 6:
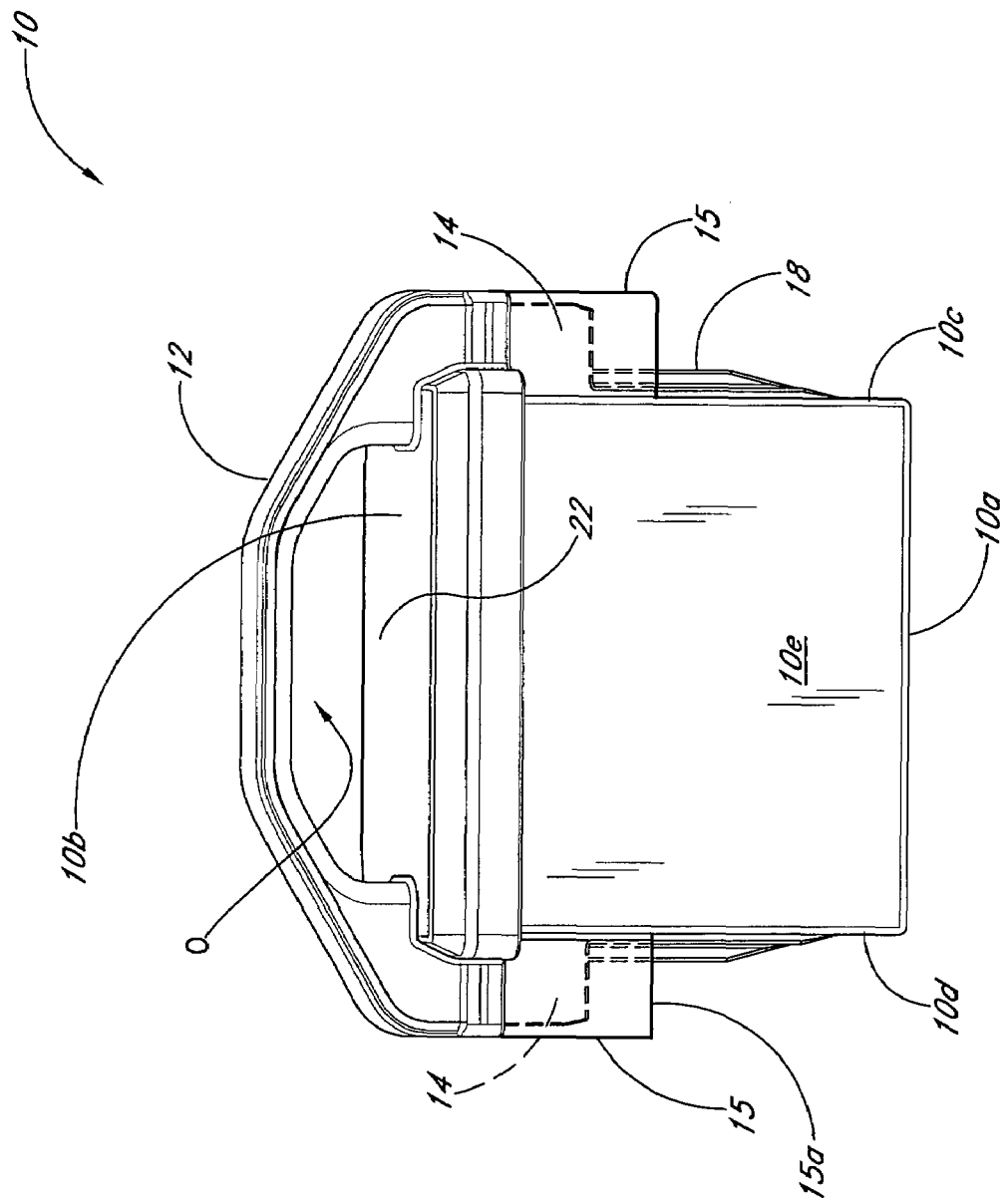
FIG. 6 is a front and top isometric view of the battery in FIG. 1.
Figure 7:
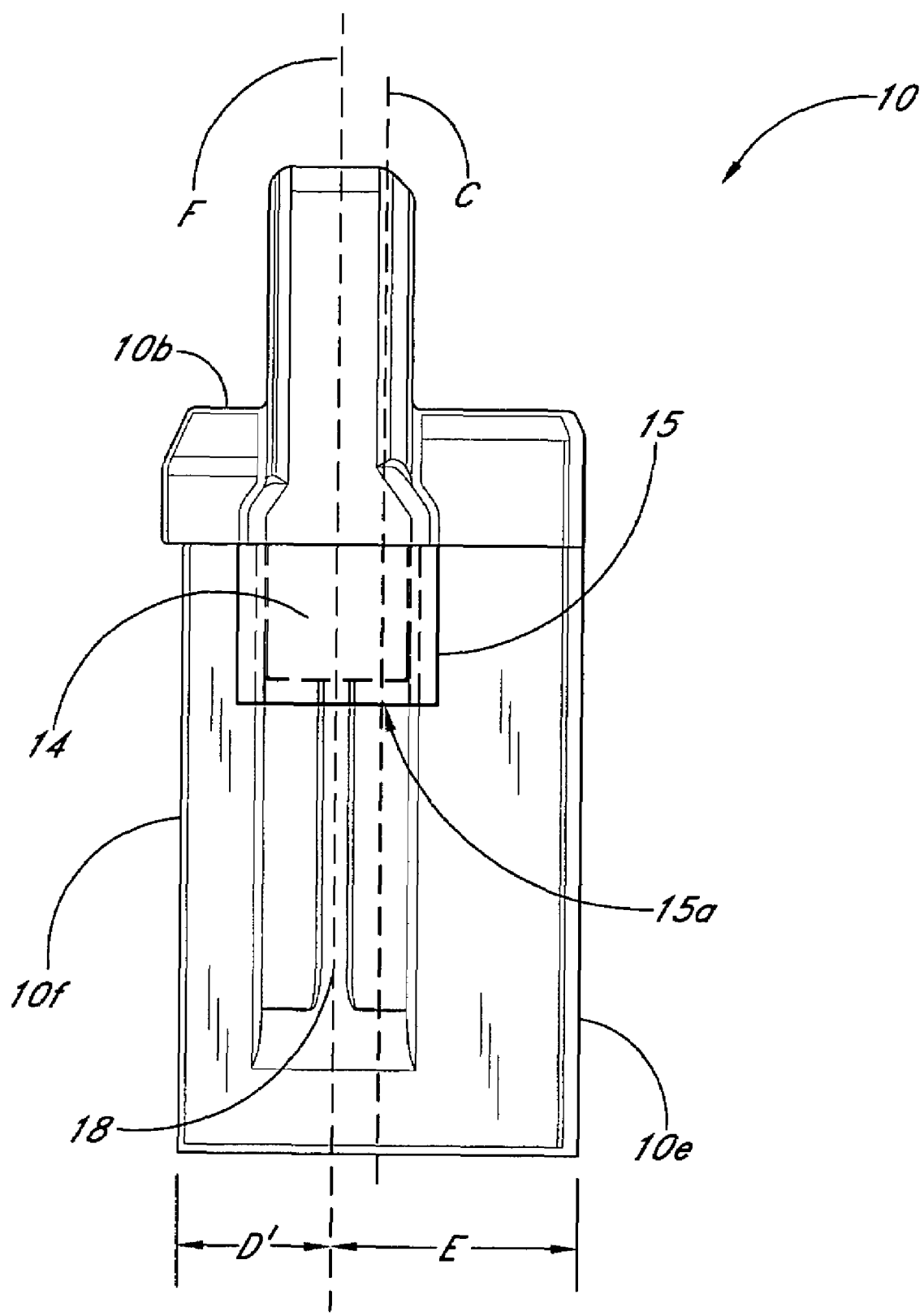
FIG. 7 is a side elevational view of the battery in FIG. 1.

In some embodiments, the battery 10 also comprises a longitudinal spline 18 extending between the compartment 14 and the base 10a of the battery 10, as best seen in FIGS. 2A, 6 and 7. In the illustrated embodiment, the spline 18 extends along a majority of the length between the compartment 14 and the base 10a.

As shown in FIGS. 2A and 3-5, the housing 20 comprises at least one side wall 22, wherein the side wall defines a free end 22a at a top portion thereof. In the illustrated embodiment, the housing 20 has two side walls 22 generally parallel to each other that extend between a base 23 and the free end 22a of the side walls 22. The side walls 22 are preferably separated by a distance generally equal to the distance between the side faces 10c, 10d of the battery 10.

The housing 20 shown in FIGS. 2A and 3-5 also comprises a rear wall 24 connected to the base 23 and the side walls 22, and defines a housing recess 25 between the side walls 22, the base 23, and the rear wall 24. The housing recess 25 is preferably configured to receive at least a portion of the battery 10 therein. In one embodiment, the base 23 is generally planar and configured to contact the base 10a of the battery 10 when the battery 10 is disposed in the recess 25. However, the base 23 can have any shape, preferably corresponding to the shape of the base 10a of the battery 10, such as concave or convex. In other embodiments, the base 23 of the housing 20 does not contact the base 10a of the battery 10. In the illustrated embodiment, the base 23 includes at least one raised portion 23a thereon, which contacts the base 10a of the battery 10 when the battery is disposed in the recess 25. In one embodiment, the raised portions 23a can be made of a compressible material, such as rubber, or the like, to provide shock absorption when the battery 10 is dropped into the recess 25.

As seen in FIGS. 2A and 3-5, each side wall 22 preferably defines a longitudinal groove 26 extending between the base 23 and a recessed portion 28 formed at the free end 22a of the side wall 22. In the illustrated embodiment, the longitudinal groove 26 extends along a majority of the length between the base 23 and the recessed portion 28. The longitudinal groove 26 is preferably configured to slidingly receive the longitudinal spline 18 of the battery 10, and preferably tapers toward the base 23 to provide a friction fit with the spline 18.

Figure 4:
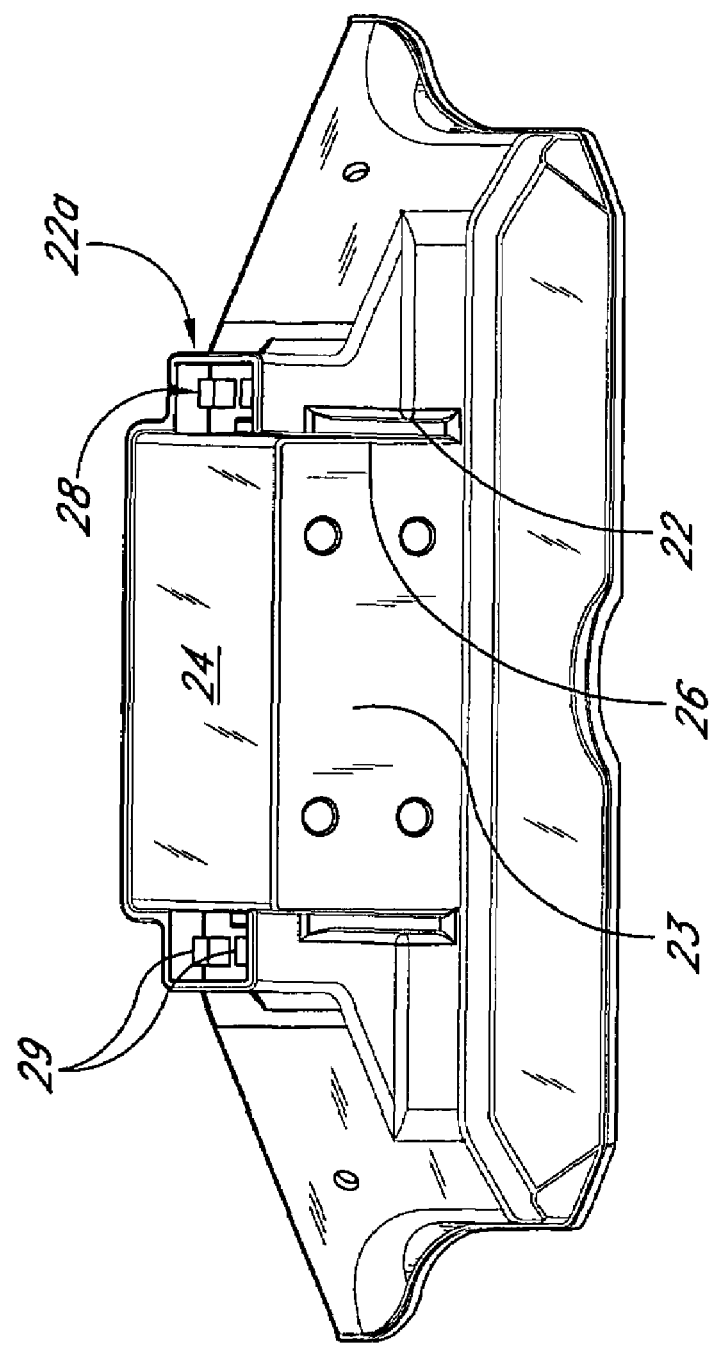
FIG. 4 is a top and front isometric view of the housing in FIG. 1.

As shown in FIG. 4, the recessed portion 28 at the free end 22a of each side wall 22 houses at least one electrical terminal 29 (e.g., a housing terminal or electrode), wherein the electrical terminal 29 faces away from the base 23. The electrical terminal 29 is preferably configured to extend into the cavity 14c of the battery compartment 14 and contact the electrical terminal 16 when the battery compartment 14 is disposed in the housing recessed portion 28.

Figure 5:
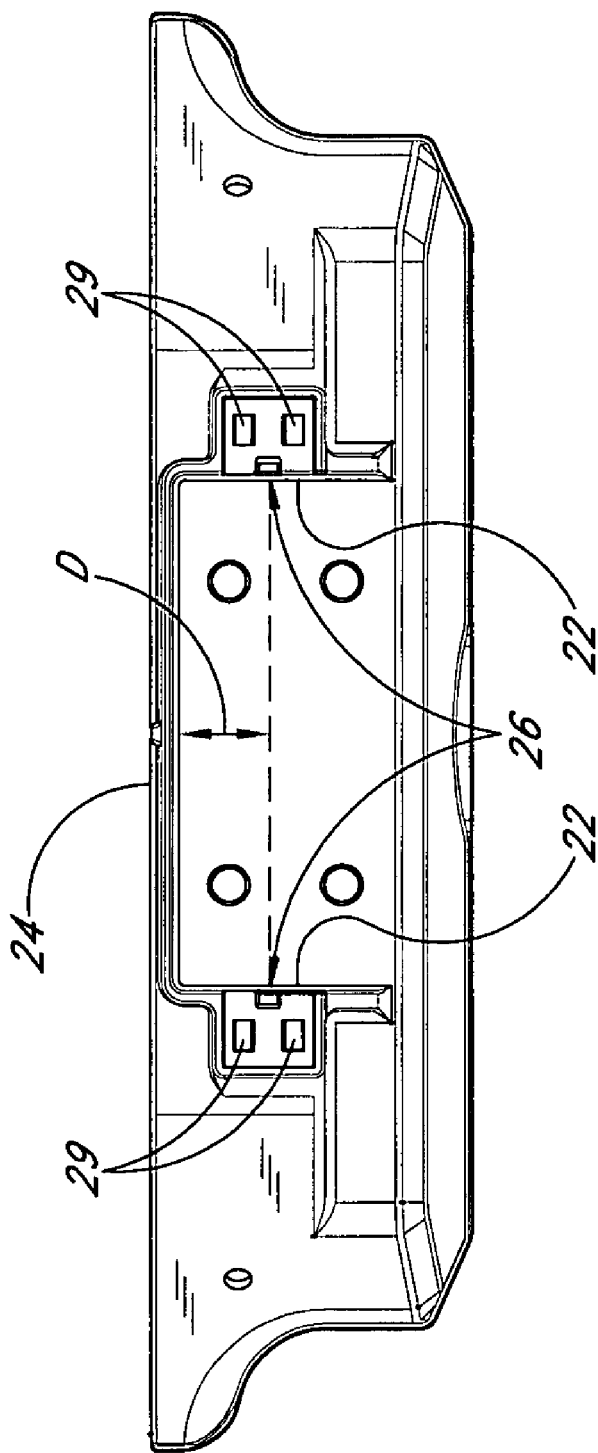
FIG. 5 is a top plan view of the housing in FIG. 1.

As best seen in FIG. 5, the rear wall 24 of the housing 20 is disposed a distance D from the centerpoints of the longitudinal grooves 26, which also correspond to the centerpoints of the recessed portions 28 that house the housing electrodes 29. The distance D preferably corresponds to the distance D' between the back face 10f and the centerpoints of the splines 18 of the battery 10 (see FIG. 7), which in turn correspond to the centerpoints of the compartments 14 that house the battery electrodes 16. Accordingly, the rear wall 24 is configured to be proximal to the back face 10f of the battery 10 when the battery 10 is disposed in the housing recess 25 and the longitudinal splines 18 are disposed in the longitudinal grooves 26. In one embodiment, the rear wall 24 of the housing 20 substantially contacts the back face 10f of the battery 10 when the battery 10 is disposed in the housing recess 25 and the splines 18 are disposed in the grooves 26.

In a preferred embodiment, shown in FIG. 7, the distance D' differs from the distance E between the longitudinal spline 18 and the front face 10e of the battery 10. In the illustrated embodiment, a longitudinal axis F of the splines 18 is offset from a longitudinal midline C of the battery 10, so that the distance D' is shorter than the distance E. Accordingly, the longitudinal grooves 26 of the housing 20 are configured to slidably receive the longitudinal splines 18 such that the back face 10f is positioned proximal the rear wall 24 of the housing 20. Due to the asymmetry of the splines 18 and receiving grooves 26, and the dimensions selected for a tight fit, the grooves 26 preferably cannot receive the splines 18 when the battery 10 is oriented with its front face 10e positioned proximal the rear wall 24 of the housing 20. Accordingly, the electrical terminals 16, 29 are configured to contact each other when the battery 10 is disposed in the housing 20 with the back face 10f facing the rear wall 24, but not with the front face 10e facing the rear wall 24. This arrangement is particularly advantageous where the terminals 16 in the compartments 14 of the battery 10 have different signs (i.e., where one is a positive terminal and the other is a negative terminal).

Figure 8:
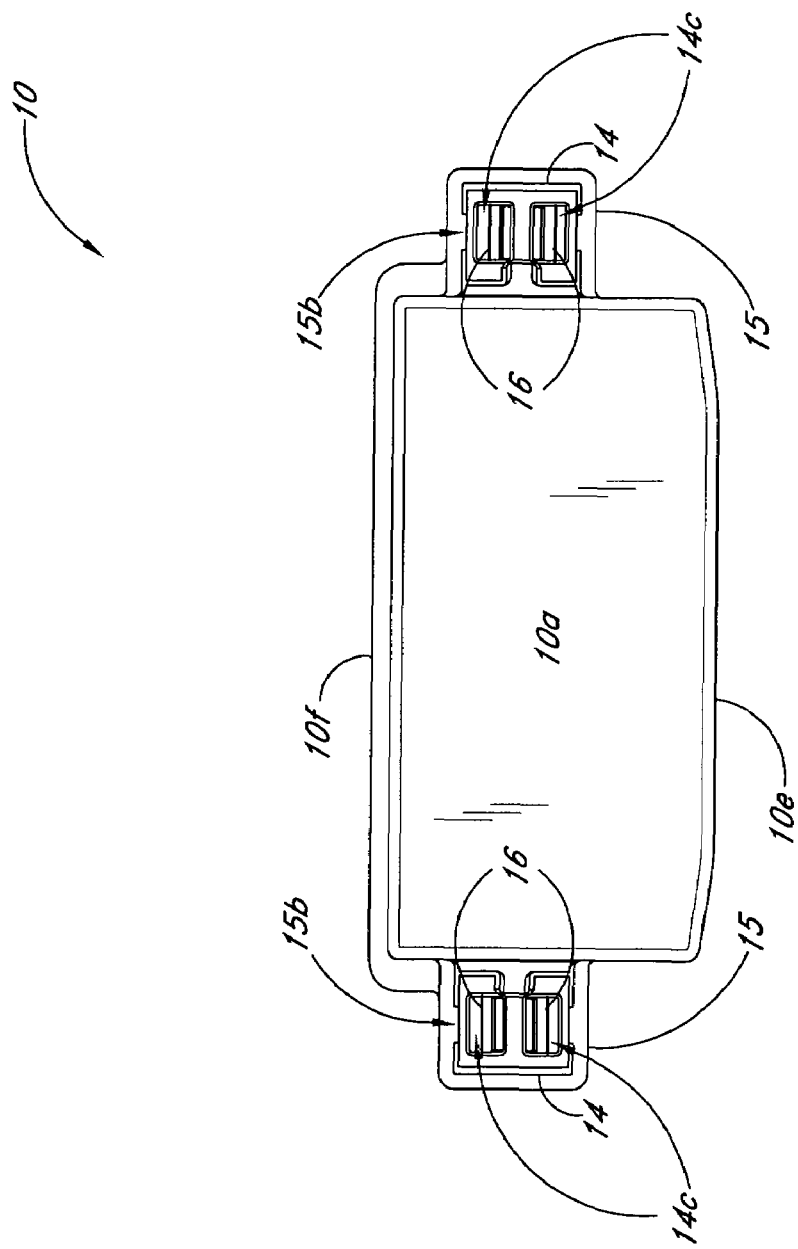
FIG. 8 is a bottom plan view of the battery in FIG. 1.

In a preferred embodiment shown in FIG. 8, each electrical terminal 16 of the battery 10 has the same sign. For example, the battery terminals 16 can be the positive terminals, so that the battery 10 comprises the "hot" terminals of the battery assembly 100. Similarly, each electrical terminal 29 of the housing 20 (as shown in FIG. 4) preferably has the same sign, opposite the sign of the battery terminals 16. For example, the housing terminals 29 can be the negative terminals, so that the housing 20 comprises the "cold" terminals of the assembly 100. Accordingly, the battery assembly 100 is configured to prevent a short circuit caused by an elongated object, such as a branch, extending between and substantially contacting each electrical terminal 29 on the housing 20. Additionally, the recessed location of each electrical terminal 16 within the cavity 14c substantially prevents the short-circuiting of the battery assembly 100 by a longitudinal object, such as a branch, touching each electrical terminal 16 of the battery 10. Moreover, the body of the battery 10 would intervene to obstruct and substantially prevent an object from coming in contact with both battery terminals 16. Insertion of the battery 10 into the housing recess 25 of the housing 20 also prevents a longitudinal object from coming in contact with each electrical terminal 16, 29 on the battery 10 and housing 20. The battery 10 would break or shatter said object as it was inserted into the housing recess 25 and push said broken or shattered pieces out of the housing recess 25.

Figure 9:
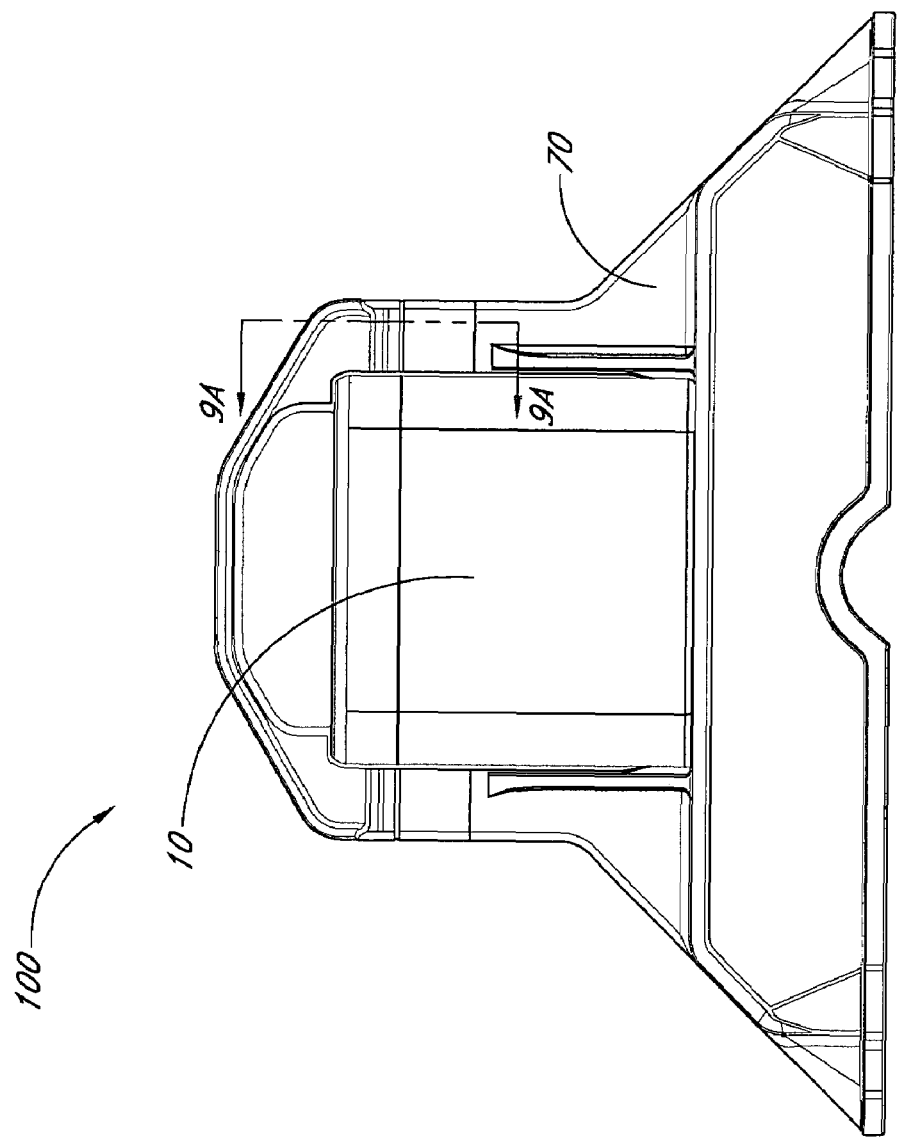
FIG. 9 is a front elevational view of the assembled battery and housing in FIG. 1.

FIG. 9B shows a sectional view of the assembled battery assembly 100 shown in FIG. 9. In the illustrated embodiment, the free end 22a of the housing side walls 22 preferably extends into the longitudinal slot 15b between the skirt 15 and the side wall 14a of the compartment 14 when the battery 10 is disposed in the recess 25. Accordingly, the skirt 15 extends about the free end 22a of the side walls 22 to provide a labyrinth seal around the electrical terminals 16, 29, minimizing the risk of moisture reaching the terminals 16, 29. As discussed above, the battery terminals 16 are preferably in the shape of a receptacle configured to receive the housing terminals 29 therein, wherein at least a portion of the battery terminals 26 contact the housing terminals 29.

Figure 10:
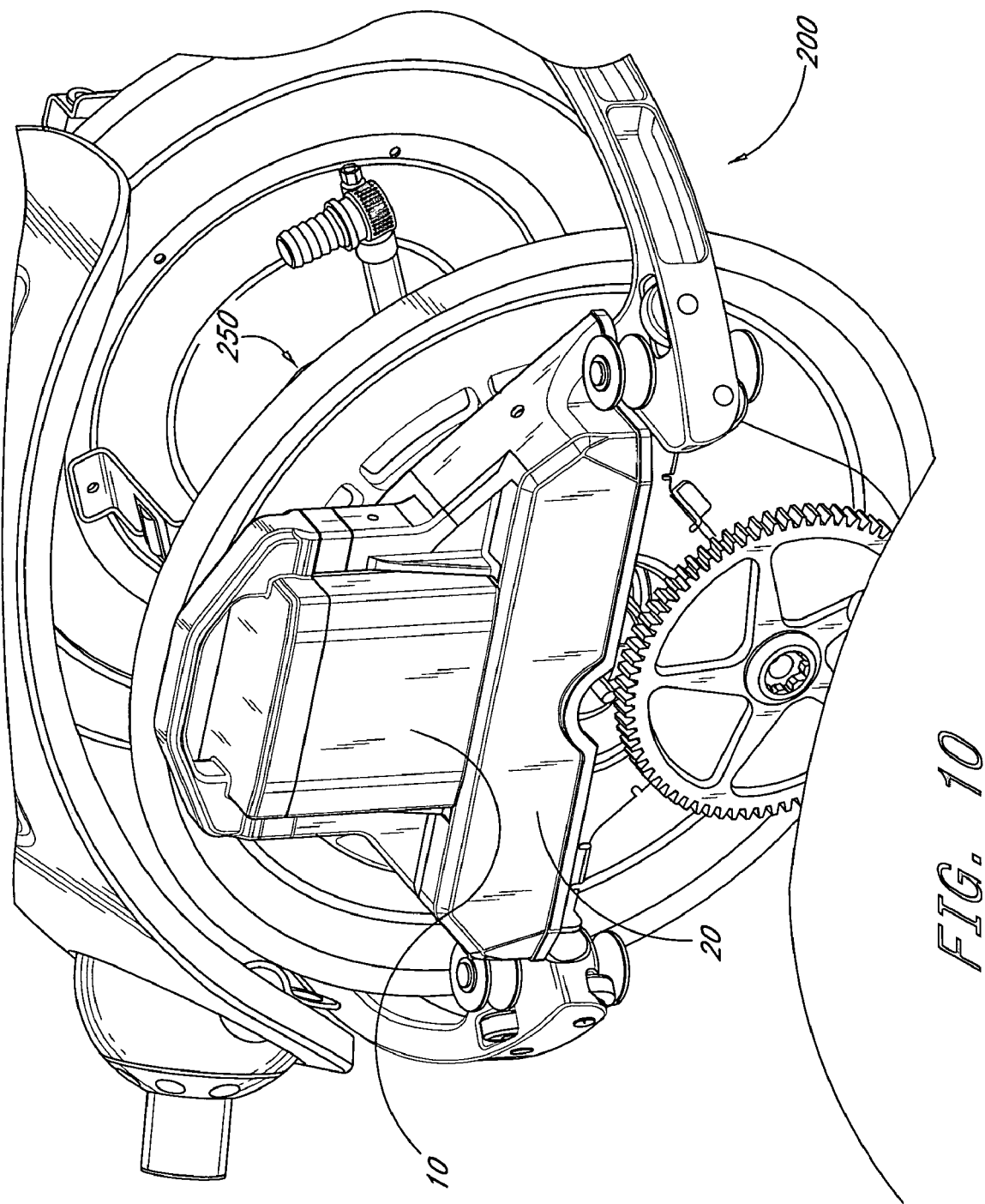
FIG. 10 is a partial top and side isometric view of a hose reel mechanism having a battery assembly, such as that shown in FIG. 1.

FIG. 10 shows the battery assembly 100 connected to a hose reel mechanism 200. For example, the battery assembly 100 can be removably mounted to the reel mechanism 200 via screws, bolts, bands or other fasteners. The battery assembly 100 is preferably configured to provide power to the hose reel mechanism 200 to operate the reel mechanism 200. For example, the battery assembly 100 can provide power to a motor (not shown) that rotates a drum 250 of the reel mechanism 200.

The embodiments of the battery assembly 100 described herein and shown in FIGS. 1-9B advantageously provide a battery assembly 100 that can be used in environments that may be exposed to fluids, such as water. Advantageously, the skirt 15 fits about the free end 22a of each side wall 22 when the battery 10 is disposed in the housing recess 25 of the housing 20, so as to provide a substantially sealed connection between the compartment 14 and the recessed portion 28. Accordingly, the battery assembly 100 is configured to substantially prevent fluids, such as water, from coming in contact with the electrical terminals 16, 29 of the battery assembly 100, which could short circuit the battery.

The assembly 100 also advantageously provides a power source that substantially reduces the risk of physical injury to a user, such as from electrical shock. As described above, each electrical terminal 16 of the battery is housed in the cavity 14c of the compartment 14, wherein the open end 14b of the compartment 14 is directed downwardly toward the base 10a of the battery 10. Each electrical terminal 16 comes in contact with its corresponding electrical terminal 29 on the housing 20 when the battery 10 is disposed in the housing recess 25 of the housing 20. Moreover, the electrical terminals 16, 29 contact each other when each compartment 14 is disposed in each recessed portion 28. Accordingly, the connection of the electrical terminals 16, 29 occurs in a substantially enclosed space, substantially preventing the inadvertent touching of any of the electrical terminals 16, 29 by a user.

As previously discussed, in one embodiment the battery 10 preferably houses terminals 16 of the same sign. Likewise, the housing 20 preferably houses the terminals of the same sign, which is opposite to the sign of the battery terminals 16. For example, in one embodiment the battery terminals 16 can be the positive terminals and the housing terminals 29 can be the negative terminals. In another embodiment, the battery terminals 16 can be the negative terminals and the housing terminals 29 can be the positive terminals. Accordingly, the battery assembly 100 is advantageously configured to prevent a short-circuit caused by an object, such as a branch or other longitudinal object, coming in contact with both of the battery terminals 16, or with both of the housing terminals 29.

If the battery 10 houses terminals of opposite signs, the battery assembly 100 is advantageously configured to prevent the incorrect connection of the terminals 16, 29 (see FIGS. 5 and 7), which may result in physical injury to a user or bystander. The housing 20 is configured to receive the battery 10 therein such that the longitudinal splines 18 are received in the longitudinal grooves 26 and the back face 10f of the battery 10 faces the rear wall 24 of the housing 20. However, the housing 20 does not permit receiving the battery 10 in the opposite orientation, i.e., with the front face 10e of the battery 10 facing the rear wall 24 of the housing 20.

Additionally, the electrical terminals 16, 29 are disposed on the battery 10 and housing 20 to substantially prevent the short-circuiting of battery assembly 100 by a body of water. The electrical terminals 16 of the battery 10 are disposed proximal the top 10b of the battery 10. Furthermore, the electrical terminals 16 of the battery 10 are disposed within a downward facing cavity 14c. Similarly, the electrical terminals 29 of the housing 20 are disposed near the free end 22a of the housing 20. Moreover, the electrical terminals 16, 29 are disposed away from their respective base or support surface 10a, 23 to minimize the probability of a body of water disposed on said base 23 from coming into contact with the electrical terminals 16, 29.

The battery assembly 100 advantageously provides a battery 10 that can be easily connected to and disconnected from its corresponding housing 20. In one embodiment, a user connects the battery 10 by disposing it on the housing 20 such that the splines 18 are slidably inserted in the grooves 26 and the compartments 14 are disposed in the recesses 28. Similarly, the user can disconnect the battery 10 by pulling the battery 10, such as by the handle 12, out of the housing 20 so that the compartments 14 are removed from the recesses 28. In another embodiment, the battery 10 and housing 20 do not have said splines 18 and grooves 22, respectively. In such an embodiment, the battery 10 is connected to the housing 20 solely by disposing the compartments 14 in the recesses 28.

One or ordinary skill in the art will recognized that the battery assembly 100 described above can be used in combination with a variety of devices requiring electrical power. In one embodiment, the battery assembly 100 can be used to provide power to a vehicle (not shown), such as a golf cart or motorized bicycle. In another embodiment, shown in FIG. 10, the battery assembly 100 is connected to a hose reel assembly 200 and provides power to a motor (not shown) thereof to drive a drum 250 of the reel mechanism 200.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus for example, those skilled in the art will recognize that the invention may be embodied or carried out in a manner that achieves or optimizes one advantage or group of advantages as taught herein without necessarily achieving other objects or advantages as may be taught or suggested herein.

All of these aspects are intended to be within the scope of the invention herein disclosed. These and other aspects of the present invention will become readily apparent to those skilled in the art from the appended claims and from the preceding detailed description of the preferred embodiments having reference to the attached figures, the invention not being limited to any particular preferred embodiment(s) disclosed.

What is claimed is:

1. A battery assembly, comprising:
    a battery having a body with a base and opposite side faces extending upwardly therefrom, a compartment connected to one side face and a second compartment connected to the opposite side face, each compartment defining a downward-facing cavity, each cavity housing an electrical terminal therein facing toward the base of the battery, each compartment including overhanging skirts disposed about the electrical terminals, the skirts substantially surrounding the electrical terminals; and
    a housing having opposite side walls extending from a base to free ends of the side walls, each of the opposite side walls defining an upward-facing recessed portion, each recessed portion housing an electrical terminal facing away from the base of the housing, wherein the recessed portions are configured to removably receive the compartments therein so that the electrical terminals of the battery operatively contact the electrical terminals of the housing.

2. The battery assembly of claim 1, wherein the compartments are offset relative to a longitudinal plane extending across a midline of the body, said offset defining a first distance between the compartments and a front face of the battery, and a second distance between the compartments and a back face of the battery, wherein the second distance is shorter than the first distance.

3. The battery assembly of claim 2, wherein the recessed portions are disposed a third distance from a rear wall of the housing, the third distance generally equal to the second distance.

4. A method for installing a battery, comprising:
    providing a battery with opposite side faces, with one battery electrode disposed on one side face and a second battery electrode disposed on the opposite side face, wherein the battery comprises compartments that house the battery electrodes, wherein the battery further comprises overhanging skirts extending about the compartments;
    providing a housing with opposite side walls, with one housing electrode disposed on one side wall and a second housing electrode disposed on the opposite side wall, wherein the housing comprises recessed portions that house the housing electrodes;
    moving the battery and housing relative to each other so that the battery electrodes and housing electrodes operatively contact each other; and
    moving the battery and housing relative to each other so that the skirts extend about the recessed portions.

5. The method of claim 4, wherein the battery electrodes face in a direction toward a base of the battery.

6. The method of claim 4, wherein the housing electrodes face in a direction away from a base of the housing.

7. The method of claim 4, wherein the battery terminals have the same sign.

8. The method of claim 4, wherein the housing terminals have the same sign.

9. The method of claim 4, wherein the battery electrodes are disposed proximal to a portion of the battery that is configured to be distal to the housing after the moving steps.

10. A battery assembly comprising:
    a battery having battery electrodes disposed on opposite sides of the battery;
    a housing having housing electrodes disposed on opposite side walls of the housing, wherein the housing is configured to removably receive the battery therein so that the housing electrodes operatively contact the battery electrodes; and
    overhanging skirts disposed about the battery electrodes, wherein the skirts substantially surround the housing electrodes when the battery is disposed in the housing.

11. The battery assembly of claim 10, wherein the battery has a base configured to be inserted into the housing and a top opposite to the base, wherein the battery electrodes are disposed proximal the top of the battery.

12. The battery assembly of claim 10, wherein the battery electrodes face towards a base of the battery.

13. The battery assembly of claim 10, wherein the battery electrodes have the same sign.

14. The battery assembly of claim 1, wherein the skirts provide a labyrinth seal around the electrical terminals.

15. The battery assembly of claim 1, wherein the compartments of the battery are disposed proximal to a portion of the battery that is distal to the housing and are configured to fit into the recessed portions of the housing.

16. The battery assembly of claim 1, wherein the electrical terminals of the battery have the same sign.

17. The battery assembly of claim 1, wherein the electrical terminals of the housing have the same sign.

18. The method of claim 4, wherein, after moving the battery and housing relative to each other so that the skirts extend about the recessed portions, the skirts providing a labyrinth seal around the battery electrodes.

19. The method of claim 4, wherein, after moving the battery and housing relative to each other so that the battery electrodes and housing electrodes operatively contact each other, the skirts substantially surround the housing electrodes.

20. The battery assembly of claim 10, wherein the housing electrodes face away from a base of the housing.

21. The battery assembly of claim 10, wherein the housing electrodes have the same sign.

22. The battery assembly of claim 10, wherein the skirts provide a labyrinth seal around the battery electrodes.

* * * * *

UNITED STATES PATENT AND TRADEMARK OFFICE
CERTIFICATE OF CORRECTION

PATENT NO. : 7,320,843 B2
APPLICATION NO. : 10/788644
DATED : January 22, 2008
INVENTOR(S) : Jeffrey M Harrington It is certified that error appears in the above-identified patent and that said Letters Patent is hereby corrected as shown below:

At column 2, line 48, delete "9B-9B of in" and insert -- 9A-9A of --, therefor.

Signed and Sealed this

Fourth Day of August, 2009

JOHN DOLL
*Acting Director of the United States Patent and Trademark Office*